(12) United States Patent
Sharp et al.

(10) Patent No.: US 7,116,315 B2
(45) Date of Patent: Oct. 3, 2006

(54) WATER TOLERANT TOUCH SENSOR

(75) Inventors: Jeffrey L. Sharp, Fredericksburg, VA (US); Chris Dews, Fremont, CA (US); Don Armstrong, deceased, late of Belmont, CA (US); by Helen E. N. Armstrong, legal representative, Belmont, CA (US)

(73) Assignee: Tyco Electronics Corporation, Middletown, PA (US)

( * ) Notice: Subject to any disclaimer, the term of this patent is extended or adjusted under 35 U.S.C. 154(b) by 389 days.

(21) Appl. No.: 10/389,391

(22) Filed: Mar. 14, 2003

(65) Prior Publication Data

US 2004/0178998 A1 Sep. 16, 2004

(51) Int. Cl.
*G09G 5/00* (2006.01)

(52) U.S. Cl. .................. 345/177; 178/18.04; 178/18.02
(58) Field of Classification Search ................. 345/173, 345/177; 178/18.01, 18.02, 18.04, 18.03
See application file for complete search history.

(56) References Cited

U.S. PATENT DOCUMENTS

| | | | |
|---|---|---|---|
| 4,642,423 A | 2/1987 | Adler | |
| 4,644,100 A | 2/1987 | Brenner et al. | |
| 4,645,870 A | 2/1987 | Adler | |
| 4,700,176 A | 10/1987 | Adler | |
| 4,746,914 A | 5/1988 | Adler | |
| 4,791,416 A | 12/1988 | Adler | |
| 4,825,212 A | 4/1989 | Adler et al. | |
| 4,859,996 A | 8/1989 | Adler et al. | |
| 4,880,665 A | 11/1989 | Adler et al. | |
| RE33,151 E | 1/1990 | Adler | |
| 5,072,427 A | 12/1991 | Knowles | |
| 5,162,618 A | 11/1992 | Knowles | |
| 5,177,327 A | 1/1993 | Knowles | |
| 5,260,521 A | 11/1993 | Knowles | |
| 5,329,070 A | 7/1994 | Knowles | |
| 5,573,077 A | 11/1996 | Knowles | |
| 5,591,945 A | 1/1997 | Kent | |
| 5,638,093 A | 6/1997 | Takahashi et al. | |
| 5,708,461 A | 1/1998 | Kent | |
| 5,739,479 A | 4/1998 | Davis-Cannon et al. | |
| 5,825,352 A | 10/1998 | Bisset et al. ................. 345/173 |
| 5,854,450 A | 12/1998 | Kent | |
| 5,856,820 A | 1/1999 | Weigers et al. | |
| 5,986,224 A | 11/1999 | Kent | |
| 6,087,599 A | 7/2000 | Knowles | |
| 6,091,406 A * | 7/2000 | Kambara et al. ........... 345/177 |
| 6,225,985 B1 | 5/2001 | Armstrong et al. | |
| 6,236,691 B1 | 5/2001 | Johnson | |
| 6,335,723 B1 * | 1/2002 | Wood et al. ................. 345/173 |
| 6,366,277 B1 | 4/2002 | Armstrong ................... 345/177 |
| 6,590,194 B1 * | 7/2003 | Sardana et al. ........... 250/208.1 |
| 6,723,929 B1 * | 4/2004 | Kent ....................... 178/18.04 |
| 6,741,237 B1 * | 5/2004 | Benard et al. ............... 345/173 |

FOREIGN PATENT DOCUMENTS

| WO | WO 01/24700 A1 | 4/2001 |
|---|---|---|
| WO | WO 01/27867 A1 | 4/2001 |

OTHER PUBLICATIONS

International Search Report for International Application No. PCT/US2004/007776, mailed Oct. 15, 2004.

* cited by examiner

*Primary Examiner*—Kent Chang

(57) ABSTRACT

A method, computer readable medium, and touch sensor system for reducing the effects of contaminants on an acoustic touch sensor. Acoustic energy is transmitted across the touch sensor substrate. Any perturbations in the acoustic energy induced by environmental events, such as valid touches or contaminants, are sensed and analyzed. If the perturbation exhibits a monotonic growth over a time period, it is considered to be a valid touch. If the perturbation exhibits a non-monotonic growth over the time period, it is considered a contaminant.

33 Claims, 9 Drawing Sheets

FIG. 1(a) PRIOR ART

No touch

FIG. 1(b) PRIOR ART

Finger touch

FIG. 1(c) PRIOR ART

Water Contamination

WATER TOLERANT TOUCH SENSOR

FIELD OF THE INVENTION

The field of the present invention relates to touch sensor technology, and more particularly to acoustic touch sensor technology.

BACKGROUND OF THE INVENTION

Touch sensors are transparent or opaque input devices for computers and other electronic systems. As the name suggests, touch sensors are activated by touch, either from a user's finger, or a stylus or some other device. Transparent touch sensors, and specifically touchscreens, are generally placed over display devices, such as cathode ray tube (CRT) monitors and liquid crystal displays, to create touch display systems. These systems are increasingly used in commercial applications such as restaurant order entry systems, industrial process control applications, interactive museum exhibits, public information kiosks, pagers, cellular phones, personal digital assistants, and video games.

The dominant touch technologies presently in use are resistive, capacitive, infrared, and acoustic technologies. Touchscreens incorporating these technologies have delivered high standards of performance at competitive prices. All are transparent devices that respond to a touch by transmitting the touch position coordinates to a host computer. Each has, of course, relative strengths and weaknesses.

Acoustic touchscreens, also known as ultrasonic touchscreens, have competed effectively with the other touch technologies. This is due in large part to the ability of acoustic touchscreens to handle demanding applications with high transparency and high resolution touch performance, while providing a durable touch surface. Acoustic touchscreen systems comprise a transparent touch sensor (i.e., a touchscreen), a controller and leads coupling the touchscreen and the controller. Typically, the touchscreen comprises a touch sensitive substrate in which an acoustic wave is propagated. When a touch occurs on the substrate surface, it results in the absorption of at least a portion of the wave energy being propagated across the substrate. The touch position is determined using electronic circuitry to locate the absorption position in an XY coordinate system that is conceptually and invisibly superimposed onto the touchscreen. In essence, this is accomplished by recording the time the wave is initially propagated and the time at which a touch induced attenuation in the amplitude of the wave occurs. The difference in these times can then be used, together with the known speed of the wave through the substrate, to determine the precise location of the touch.

A common type of acoustic touchscreen employs Rayleigh type acoustic waves—where the term is intended to include quasi-Rayleigh waves. Illustrative disclosures relevant to Rayleigh wave touchscreens include U.S. Pat. Nos. 4,642,423; 4,645,870; 4,700,176; 4,746,914; 4,791,416; Re 33,151; U.S. Pat. Nos. 4,825,212; 4,859,996; 4,880,665; 4,644,100; 5,739,479; 5,708,461; 5,854,450; 5,986,224; 6,091,406; 6,225,985; and 6,236,691. Acoustic touchscreens employing other types of acoustic waves such as Lamb or shear waves, or combinations of different types of acoustic waves (including combinations involving Rayleigh waves) are also known. Illustrative disclosures of these technologies include U.S. Pat. Nos. 5,591,945; 5,854,450; 5,072,427; 5,162,618; 5,177,327; 5,329,070; 5,573,077; 6,087,599; 5,260,521; and 5,856,820. The above cited patents are hereby incorporated by reference into this application.

Acoustic touchscreens, including Elo TouchSystems, Inc.'s IntelliTouch® products, which sense touch via the absorption of Rayleigh waves, have proved to be commercially successful. The success of products using Rayleigh waves is due in large part to two properties exhibited by Rayleigh waves. First, Rayleigh waves are typically more sensitive to touch than are other acoustic waves. Second, Rayleigh waves are surface waves that can propagate on the surface of any simple homogenous glass substrate of sufficient thickness.

However, Rayleigh waves are sensitive to liquid contaminants such as oil and water. These contaminants absorb energy from the propagating waves. A drop of water can generate a signal that in many ways behaves like a touch signal. Contamination of the touchscreen by water on the surface, say as the result of a spill, a sneeze, or rain, can produce false readings, since the contaminant absorbs some of the Rayleigh wave and consequently attenuates a portion of the wave amplitude, i.e., it generates a dip in the wave amplitude. It is important to minimize the adverse effects of water and other contaminants.

Figure 1A:
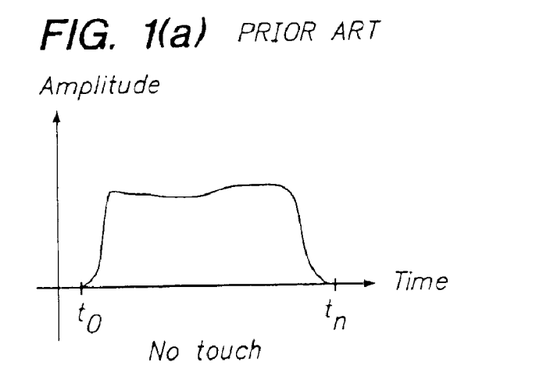
FIGS. 1(a)–(c) are three graphs of acoustic wave forms generated using a prior art acoustic touch system, and showing no touch, finger touch, and water contamination behavior.
Figure 1B:
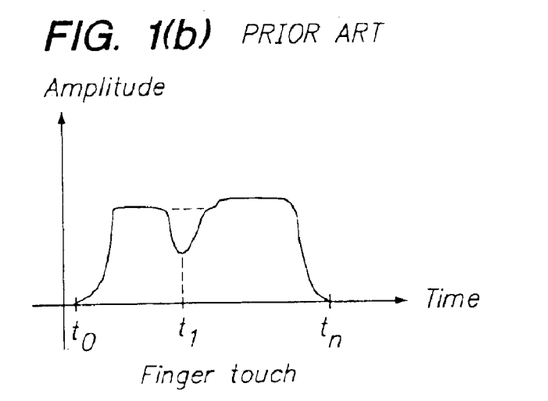
Figure 1C:
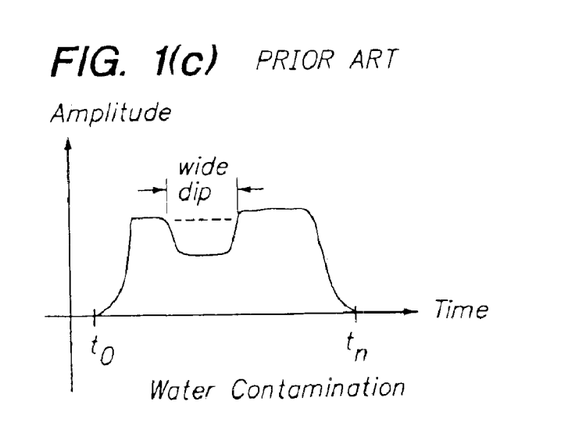

One approach that has been used to deal with the problem of water contamination, makes use of the fact that—depending on the amount of water contamination—the corresponding amplitude dip may be wider than for a normal finger touch. This phenomenon is illustrated in FIGS. 1(a)–(c), which shows three separate graphs of amplitude versus time. FIG. 1(a) shows the behavior with no touch or water, and hence shows no dip at all. FIG. 1(b) shows the dip associated with a finger touch. FIG. 1(c) shows the dip associated with water contamination. As FIGS. 1(1b) and 1(c) illustrate, the water contamination dip may be wider than the normal finger touch dip, and thus, such water contamination can therefore be distinguished from normal finger touches. This water rejection algorithm has been in use since the earliest commercial acoustic touchscreen products. A later more explicitly documented example of the application of algorithm use of dip widths (but not applied to water contamination) is found in U.S. Pat. No. 5,638,093, which considers the use of dip width to differentiate between different types of touches. This patent is hereby incorporated by reference into this patent application. Unfortunately, not all water drops produce wide dip shapes, and thus, it is often difficult to distinguish between water contamination and actual touches using this methodology.

Another ameliorative approach involves reference waveform updating. A static dip from a water contaminant is eventually "memorized out" and becomes part of the reference waveform. Thus, an implementing algorithm may redefine as a contaminant any dip that remains static for more than 30 seconds, for example, and update the reference waveform accordingly. Of course, an appropriate wait time, such as, for example, 30 seconds, must be carefully established. This is important because, like contaminants, valid touches may also have a significant duration. Such an updating algorithm prevents a valid touch from being blocked by a water drop that landed on the touch surface well in advance of the finger touch. This algorithm thus improves system performance.

However, there is still a problem with water contamination of width comparable to a finger, that arrives close in time to a valid finger touch. For example, if the user's fingers are wet from the condensation of a cold drink, a valid finger touch may also leave a residue of water contamination with a width the size of finger touch. In such cases, there is a risk that the ultrasonic touch system will continue to consider the wet finger to be touching the touchscreen surface, and thus, block out the next valid touch. One way to obviate this difficulty is simply to declare that the last touch to appear "wins." Algorithms that use this approach have the advantage that a valid touch will automatically override any contaminant induced dips, so that the system will respond "instantaneously" to the user's latest input. Thus, even if water contaminants cause a spurious input, the user quickly regains control.

While reasonably effective in reducing the negative effects of water on system performance, the "last touch wins" algorithm does not support multiple simultaneous touches. Multiple touch algorithms are considered in U.S. Pat. No. 5,854,450, which is hereby incorporated by reference. Applications that demand multiple touch capability, such as, for example, two-player video games, still demand water rejection that matches or improves upon current levels of water-rejection performance. Present algorithms cannot satisfy both these demands. This increases the need for additional algorithm methods for recognizing and rejecting water contamination.

Different acoustic modes vary in their susceptibility to water. The Rayleigh waves typically used in ultrasonic touchscreens are strongly absorbed by radiation damping, even for a zero viscosity fluid. In contrast, absorption of shear waves depends only on viscous damping. As a result, shear waves are much less affected by water than are the more commonly used Rayleigh waves. For example, U.S. Pat. No. 5,177,327 teaches a variant of ultrasonic touchscreen technology using horizontally polarized shear waves. Touchscreens using this technology demonstrate a high degree of water immunity. Indeed, the substrate surface can be completely submerged in water, and still correctly sense the position of finger touches. For ultrasonic touchscreen applications with very high levels of water contamination, use of shear acoustic modes may well be required.

The use of shear acoustic modes, however, comes with a cost. Shear modes are generally much less sensitive to touch than are Rayleigh waves. Furthermore, the use of shear modes often require complex, and hence more costly, substrate designs than does the Rayleigh mode. For applications subject to more moderate levels of water contamination, it is therefore preferable, whenever possible, to enhance water rejection using signal processing, and to continue to use the lower cost Rayleigh mode touchscreens.

Hence, despite the shear acoustic mode option, there remains a significant need for improved water rejection signal processing that supports multiple touch capability. Moreover, even if multiple touch capability is not required, there is still a need for improved water rejection signal processing, since any improvement in water tolerance will enable ultrasonic touchscreens to be used in applications with higher levels of water contamination.

SUMMARY OF THE INVENTION

In accordance with a first aspect of the present inventions, a method of reducing the effects of contaminants on a touch sensor substrate, which can either be transparent or opaque, is provided. The method comprises transmitting acoustic energy (e.g., a plurality of wave components) across the substrate. Although the acoustic energy can come in any form, Rayleigh-like acoustic waves are used in the preferred method. The method further comprises sensing a perturbation in the acoustic energy induced by an environmental event (e.g., an attenuation in the energy level caused by a touch or a contaminant) and analyzing a growth of the perturbation over a time period. In the preferred method the time period is predetermined, e.g., a time period that is below the level of human perception (e.g., equal to or less than 30 milliseconds). While any environmentally induced perturbation growth can be analyzed by the method, in one preferred method the perturbation growth is analyzed if and when the perturbation is greater then a threshold level. The method lastly comprises identifying the environmental event as either a contamination or a touch based on the nature of the perturbation growth.

For example, if the environmental event induced perturbation exhibits non-monotonic growth, the method can identify the event a result of contamination on the substrate. The contaminant can, for example, be a liquid such as water, though one skilled in the art will appreciate that other contaminants can be identified using the method, without departing from the spirit of the invention. On the other hand, if the perturbation exhibits monotonic growth, the method can identify the event as a valid touch. In one preferred method, the robustness of the method can be increased so that the environmental event can be identified as a contamination if the perturbation exhibits significant non-monotonic growth. In another preferred method, the environmental event can be identified as a valid touch if the perturbation exhibits convincingly monotonic growth. In another preferred method, the environmental event is identified as a contamination if the perturbation exhibits simple non-monotonic growth, and it is identified as a valid touch if the perturbation exhibits simple monotonic growth. Moreover, one skilled in the art will appreciate that combinations of these methods can be used without departing from the spirit of the invention.

The nature of the perturbation growth can be analyzed in a number of ways, but in one preferred method, the perturbation growth is analyzed over a plurality of acoustic scans that are transmitted across the substrate during the time period. In this case, the analysis of the perturbation growth comprises comparing the perturbations during the plurality of acoustic scans. The analysis of the perturbation growth can further comprise identifying the perturbation growth as non-monotonic if for some i and some k, each a positive integer, the perturbation during the $(i+k)^{th}$ acoustic scan is less than the perturbation during the $i^{th}$ acoustic scan. When this type of analysis is used, the perturbation growth can be identified as monotonic if the $(i+k)^{th}$ acoustic scan is greater than the perturbation during an $i^{th}$ acoustic scan for all i and k. One way to apply this type of analysis and compare perturbations is to calculate the differences between the maxima of the absolute values of the perturbations. Alternatively, this analysis can be performed by calculating the differences between waveforms of the perturbations.

Once the method has identified the environmental event that induced the signal perturbation as a valid touch, the method can further comprise identifying a coordinate of the location of the perturbation on the substrate based on the at least one parallel wave component.

In accordance with a second aspect of the present inventions, a computer readable medium for reducing the effects of contaminants on a substrate is provided. The computer readable medium stores instructions, which when executed, analyze a growth of a perturbation within a signal over a time period—the perturbation being induced by an environmental event associated with the substrate—and identify the environmental event as either a contamination or a touch, based on the nature of the perturbation growth. The steps performed by the executed instructions can be accomplished in the same manner described above.

In accordance with a third aspect of the present inventions, a touch sensor system is provided. The touch sensor system comprises a substrate, an ultrasound transmitter configured for transmitting acoustic energy across the substrate, an ultrasound receiver configured for receiving the acoustic energy from the substrate, and a controller configured for determining the presence, within the acoustic energy, of a perturbation induced by an environmental event, analyzing a growth of the perturbation over a time period, and identifying the environmental event as either a contamination or a touch, based on the nature of the perturbation growth. The controller can accomplish this by the same method described above. It can be appreciated that the controller can be implemented in hardware, software, firmware, or any combination thereof.

BRIEF DESCRIPTION OF THE DRAWINGS

The drawings illustrate the design and utility of a preferred embodiment of the present invention, in which similar elements are referred to by common reference numerals. In order to better appreciate the advantages and objects of the present invention, reference should be made to the accompanying drawings that illustrate this preferred embodiment. However, the drawings depict only one embodiment of the invention, and should not be taken as limiting its scope. With this caveat, the invention will be described and explained with additional specificity and detail through the use of the accompanying drawings in which.

DETAILED DESCRIPTION OF THE PREFERRED EMBODIMENTS

Figure 2:
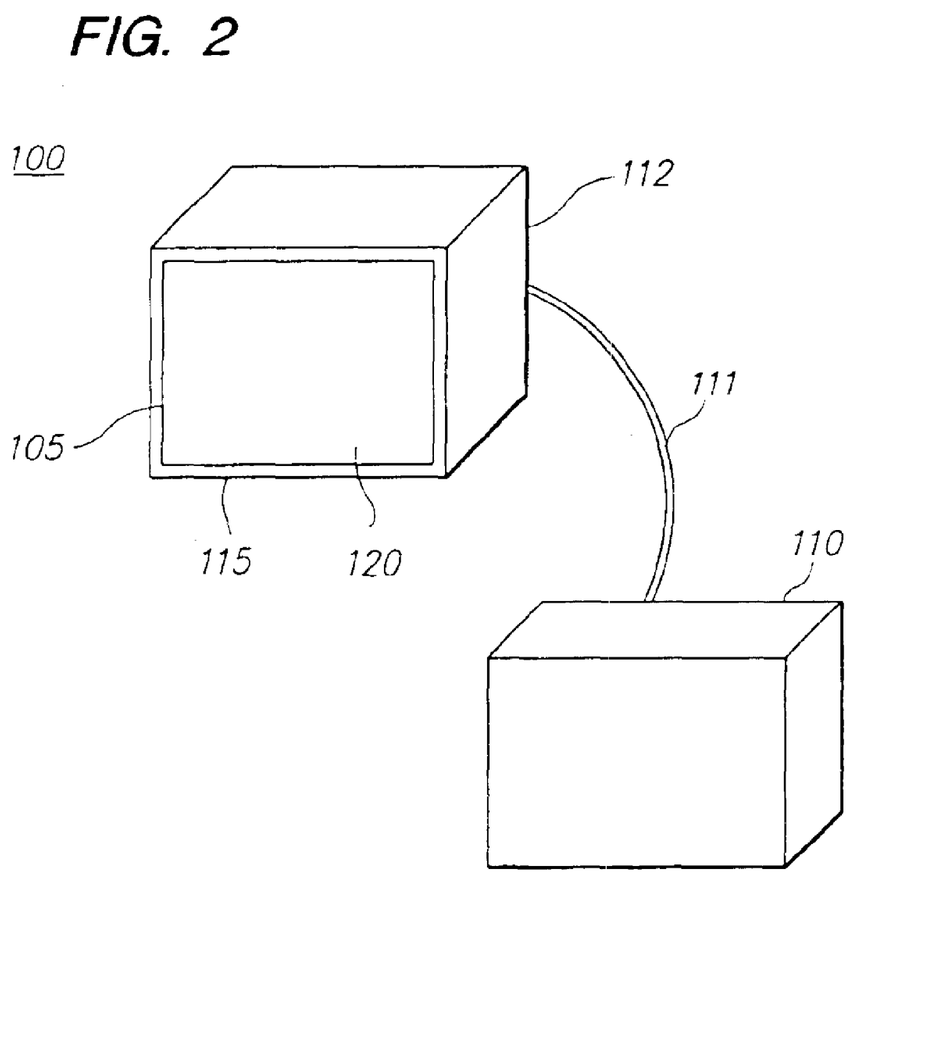
FIG. 2 is a touchscreen system constructed in accordance with one embodiment of the present invention.
Figure 3:
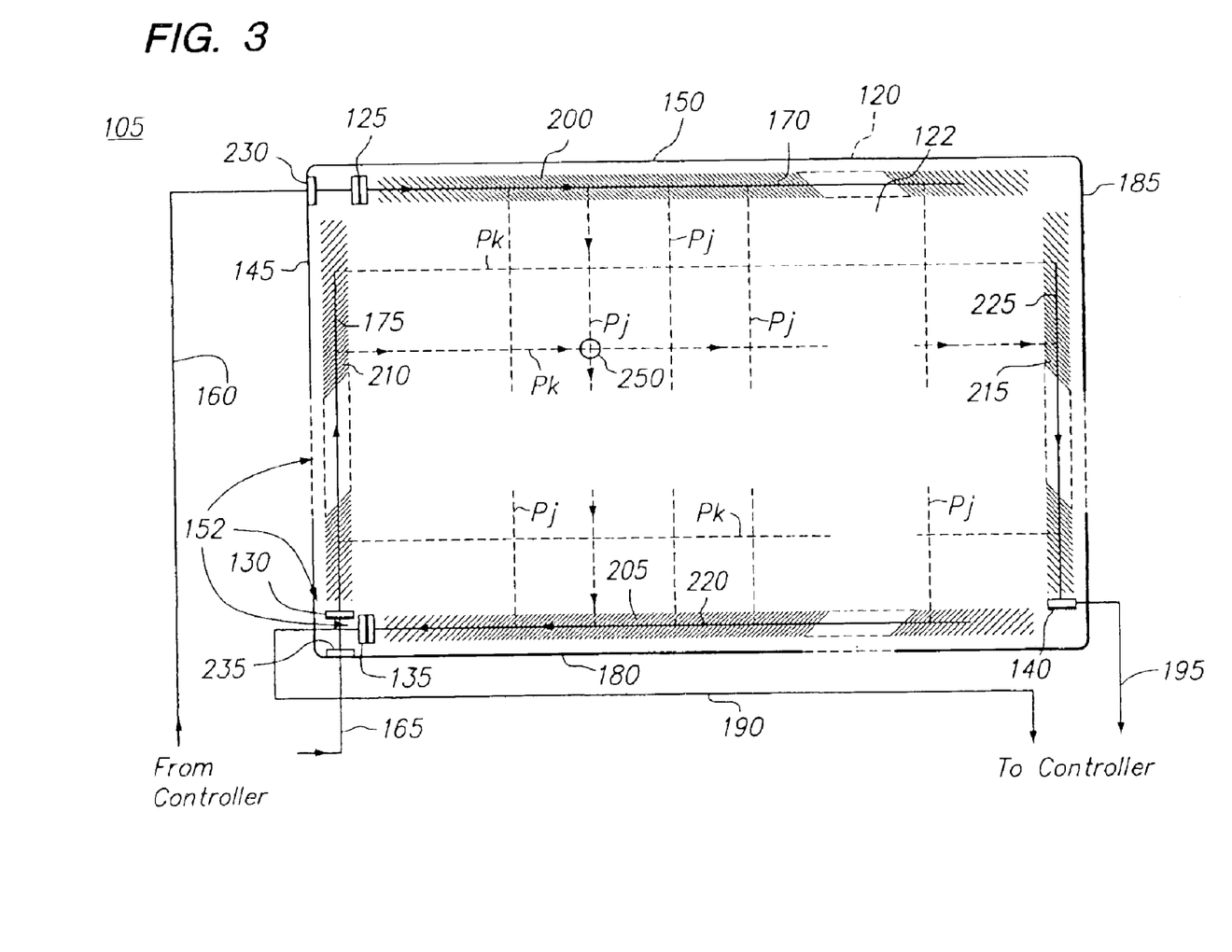
FIG. 3 is a plan view of a touchscreen used in the system of FIG. 2.

Referring to FIGS. 2 and 3, a touchscreen system 100 constructed in accordance with a preferred embodiment of the present invention is described. The touchscreen system 100 generally comprises a touchscreen 105 (i.e., a touch sensor having a transparent substrate), a controller 110, and a lead 111 coupling the controller 110 to the touchscreen 105. In combination, the touchscreen 105 and controller 110 make up a touchscreen system, which is used in conjunction with a display device 115. The touchscreen system 100 is configured to respond to a touch on the touchscreen 105 by causing acoustic signals to be transmitted across the touchscreen 105, one or more of which are modulated in the presence of the touch. The controller 110 in turn uses the modulated signal to identify the location on the touchscreen 105 where the touch occurred. The controller 110 also uses the modulated signal to distinguish between valid touches and water contamination. If the controller 110 identifies a touch as valid, it transmits the touch's position to a host computer (not shown) that then implements a corresponding computer function to display the pertinent information, e.g., graphics, on the display device 115.

The display device 115 can take the form of any device that displays pertinent information to an observer. For example, in the illustrated embodiment, the display device 115 takes the form of a cathode ray terminal (CRT), and the displayed information can, for example, be graphics such as an icon or a menu or directory from which the user can choose options. However, it will be appreciated by one of ordinary skill in the art that the touchscreen system 100 can employ many other types of display devices, such as, for example, electroluminescent or liquid crystal devices, or even displays as simple as an elevator number display, any of which can be used in lieu of a CRT. In the illustrated embodiment, the touchscreen 105 is mounted on the display device 115. Alternatively, the touchscreen 105 may be disposed over a preexisting faceplate of the display device 115, or the touchscreen 105 may be located remotely from the display device 115, such as, for example, as a tablet.

In any event, graphics or other information may be ordered up for display on the display device 115 in response to an operator's command, which can take the form of a touching of a particular area of the touchscreen 105. In alternative embodiments, a display device 115 need not be employed, such as when the display of graphics or other information is not required. Whether it is mounted in front of a display device or is a separate panel, the touchscreen 105 comprises a substrate 120 with a surface 122 that can be touched by a user, and a transmit/receive assembly 152 that is disposed onto the substrate 120. As will be discussed in further detail below, the act of touching the surface 122 causes some of the acoustic wave's energy to be absorbed by the touch, thus producing a perturbation of the surface wave propagating through the region of the touch. The perturbation is manifested as an interruption or reduction of the wave energy directed along one or more paths that form an invisible XY grid overlaying the substrate surface 122. Detection and analysis of such perturbation serves to identify the X and Y coordinates of the touched area.

To this end, the controller 110 operates the transmit/receive assembly 152 in a predetermined sequence so that when a touch-induced perturbation of acoustic wave energy is detected, converted to an electrical signal, and fed back to the controller 110, the location of the touch, as well as the touch pressure employed to induce the perturbation, are identifiable by the controller 110 and converted to control signals containing information indicative of touch location and touch pressure. In performing its function, the controller comprises coded instructions (stored, for example, in a memory of a processor), which when executed, performs the necessary steps to control and process the relevant signals. It should be noted, however, that the controller need not possess a computer, but can be totally implemented in hardware or firmware.

In the illustrated embodiment, the transmit/receive assembly 152 comprises a pair of transmitter or input transducers 125 and 130, a pair of receiver or output transducers 135 and 140, and four reflective gratings 200–215. Both the transmitter transducers 125 and 130 and the receiver transducers 135 and 140 are typically piezoelectric transducers comprised of a suitable material such as, for example, lead zirconate titanate ceramic mounted on a prism of lower velocity material, such as, for example, Lucite, which effects an efficient electro-mechanical coupling to the substrate surface 122. The transmitter transducers 125 and 130, and the receiver transducers 135 and 140, are mounted to the substrate surface 122 opposite each other. That is, the transmitter transducers 125 and 130 are mounted to the substrate surface 122 adjacent to the left and upper edges 145 and 150 of the substrate 120, respectively, and the receiver transducers 135 and 140 are mounted to the substrate surface 122 adjacent to the lower and right edges 180 and 185 of the substrate 120, respectively. Thus, each receiver transducer is mounted on the edge opposite to its associated transmitter transducer.

The controller 110 causes acoustic energy to be transmitted across the touchscreen substrate surface 122 by applying electrical input firing signals to lines 160 and 165 leading to the respective transmitter transducers 135 and 140, which in turn convert the signals into mechanical energy, thereby generating a burst of acoustic waves that traverse the substrate surface 122. Each acoustic wave is propagated along axes 170 and 175 through reflective arrays 200 and 210 where it is reflected across the substrate surface 122 to reflective arrays 205 and 215 on the opposite side of the substrate surface 122. The wave is then reflected by the reflective arrays 205 and 215 along axes 220 and 225 to receive transducers 135 and 140 where it is converted back into electrical energy as output signals on lines 190 and 195 leading from the respective receive transducers 135 and 140. These output signals contain touch information. The position characteristic is determined using the known speed and path of the acoustic wave in the substrate surface 122, the starting time of the wave, and the time at which the perturbation in the wave reaches the receiver transducer, either 135 or 140.

In the manner just described, and as depicted in FIG. 3, the surface 122 is provided with an invisible, overlaid grid comprising a multiplicity of intersecting paths of acoustic surface wave bursts which are confined to predetermined paths. One series of paths $p_j$ is disposed parallel to the vertical or minor axis of the display surface 122 to provide X-coordinate information of a touch, while a second intersecting series of paths $p_k$ is disposed parallel to the horizontal or major axis of the surface 122 to provide Y-coordinate information for the touch. Further details on the use of this architecture to determine the positional coordinates of touches on a touchscreen are described in U.S. Pat. No. 4,644,100, which has been previously incorporated herein by reference.

The above discussion has focused on the manner in which the touchscreen system 100 identifies a valid touch. The discussion now turns to the manner in which the system 100 deals with invalid or false touches that are the result of contamination, such as when water is spilled onto the screen 105. As in the case of a valid touch, when water lands on the surface 122 it absorbs acoustic wave energy, and hence produces a concomitant dip in the amplitude of the signal representative of the received acoustic wave. However, there is a subtle difference in the natures of valid touch dips and water induced dips. In order to appreciate this subtle difference, it is instructive to consider, not only the graphs of amplitude as a function of time, but also the associated graphs of dip depth as a function time. For these graphs to provide meaningful information, it is useful to restrict the focus of attention to an appropriate reaction time window. Here the term "reaction time window" is defined as the time interval between the beginning of an environmental event—either a touch event or a contamination event—and the time at which the system 100 decides whether a touch event has occurred. As previously indicated, humans perceive an event that occurs within a time interval of at most a few tens of milliseconds as instantaneous. Hence, an appropriate reaction time window is a time interval of a few tens of milliseconds in length, preferably about 30 milliseconds. Within the reaction time window, the system 100 performs multiple scans of the surface 122, i.e., it sends multiple acoustic waves across the surface 122, thus generating multiple data points.

With the above as prelude, the difference in dip depth behavior between valid touches and water induced dips is illustrated in FIGS. 4–8. In each case, acoustic waves associated with only three acoustic scans are illustrated for purposes of simplicity. It should be noted, however, that many more acoustic scans are typically performed within a reaction time window. Also, the fact that the system 100 is performing multiple scans within the reaction time window means that the resultant dip depth graphs can be thought of as continuous functions, even though they are, in the mathematical sense, discrete and hence discontinuous.

Figure 4:
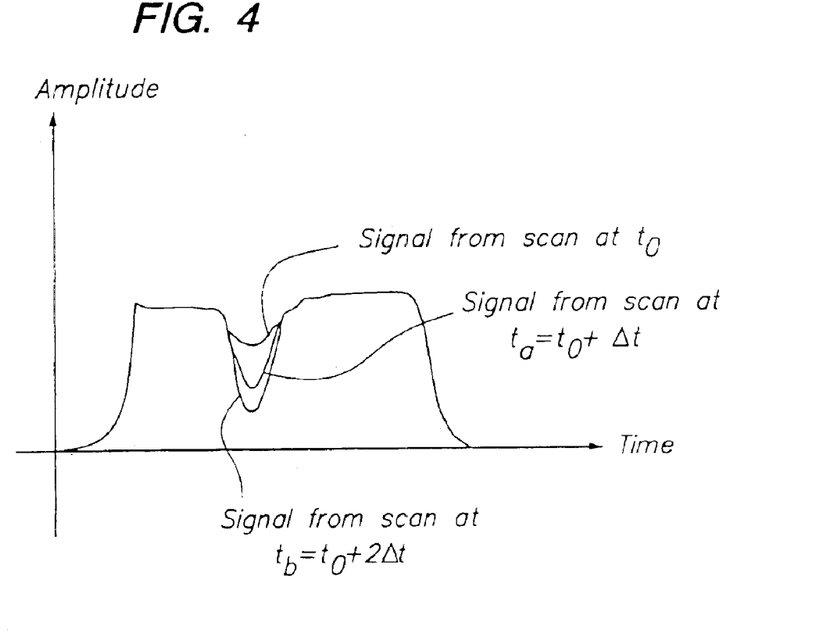
FIG. 4 is a series of graphs of three acoustic wave forms, generated by the system of FIG. 2, superimposed on each other, showing the monotonic dip depth behavior of a valid touch.

FIG. 4 shows a graph of acoustic wave amplitude as a function of time within each scan, resulting from a valid or normal touch on the substrate surface 122—which can include the case of a wet finger touch. FIG. 4 shows the dip in amplitude for three scans at three scan times: $t_0$, $t_a = t_0 + \Delta t$ and $t_b = t_0 + 2\Delta t$, where $t_0$ is the start time of the first scan in which the dip depth crosses the touch threshold previously mentioned, and $\Delta t$ is the time between scans, typically a few milliseconds. In other words, $t_0$, $t_a$, and $t_b$ are the start times for three separate scans within the reaction time window. The waveforms for the three scans have been superimposed on top of each other to facilitate dip depth comparison, so that the monotonic dip depth behavior can be conveniently represented on one graph. In the representation in FIG. 4, the event induces a dip in the acoustic wave, with the dip depth increasing monotonically as a function of scan time within the reaction time window. Thus, the dip depth of the waveform received during the scan at $t=t_0$ is less than the dip depth of the waveform received during the scan at $t=t_a$, and the dip depth of the waveform received during the scan at $t=t_a$ is less than the dip depth of the waveform received during the scan at $t=t_b$.

Figure 5:
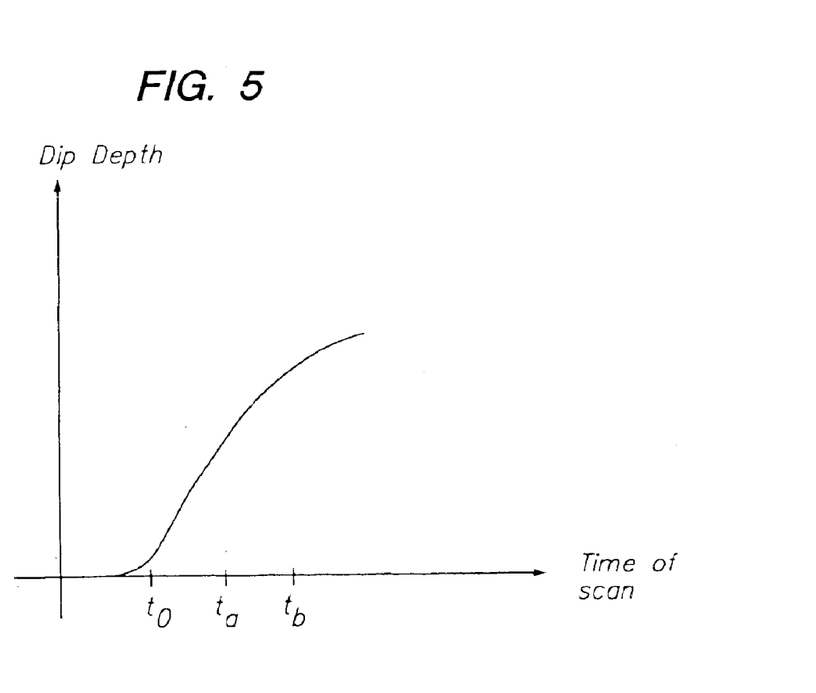
FIG. 5 is a graph of the maximum dip depth as a function of scan time for the acoustic wave forms of FIG. 4.

FIG. 5 is a graph of the maximum dip depth as a function of scan time over the same reaction time window of FIG. 4. Although the dip depth function shown in FIG. 5, in actuality, is discrete as represented by three points at the respective scan times of $t_0$, $t_a = t_0 + \Delta t$ and $t_b = t_0 + 2\Delta t$, for illustrative purposes, the dip depth function is shown as being continuous (i.e., there are an infinite number of scans within the time reaction window). FIG. 5 shows that within the reaction time window, dip depth as a function of scan time is a monotonically increasing function. Of course, once the user's finger is removed from the screen, the dip depth will immediately decrease. However, within the reaction time window—which is also within the time frame of an event that is perceived as instantaneous to the user—the dip depth function is monotonically increasing.

Figure 6:
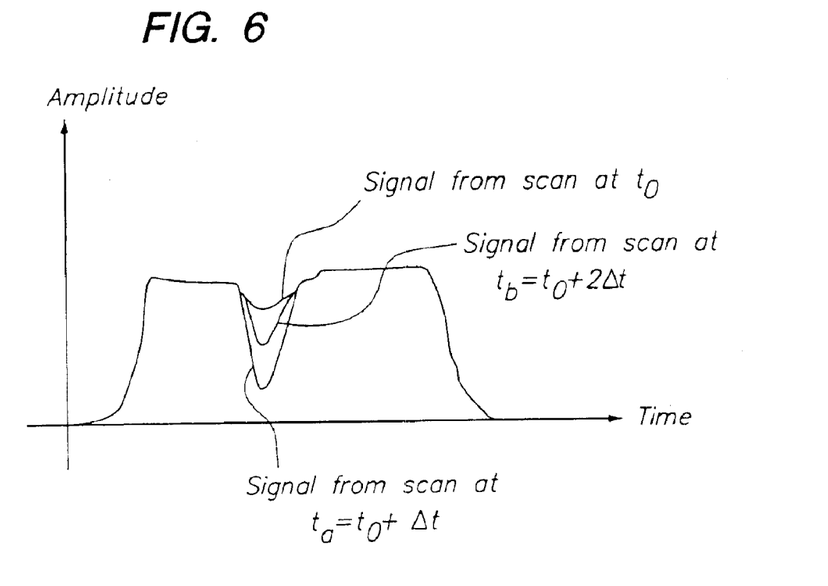
FIG. 6 is a series of graphs of three acoustic wave forms, generated by the system of FIG. 2, superimposed on each other, showing the non-monotonic dip depth behavior of an invalid touch.

FIG. 6 shows a graph of acoustic wave amplitude as a function of time within each scan resulting from water contamination on the substrate surface 122. As in the discussion of FIG. 4, FIG. 6 shows the dip in amplitude of waveforms received during scans at the points: $t_a=t_0+\Delta t$ and $t_b=t_0+2\Delta t$, where $t_0$ is the start time of the scan time in which the dip depth crosses the touch threshold previously mentioned, and $\Delta t$ is the time between scans. In other words, $t_0$, $t_a$ and $t_b$ are the start times for three separate scans within the reaction time window. The waveforms for the three scans have been superimposed on top of each other to facilitate dip depth comparison, so that the non-monotonic dip depth behavior can be conveniently represented on one graph. In this case, and in contradistinction to the behavior seen in FIG. 4, the dip depth at scan time $t=t_a$ is greater than the dip depth at scan time $t=t_b$. In other words, the dip depth function exhibits non-monotonicity.

Figure 7:
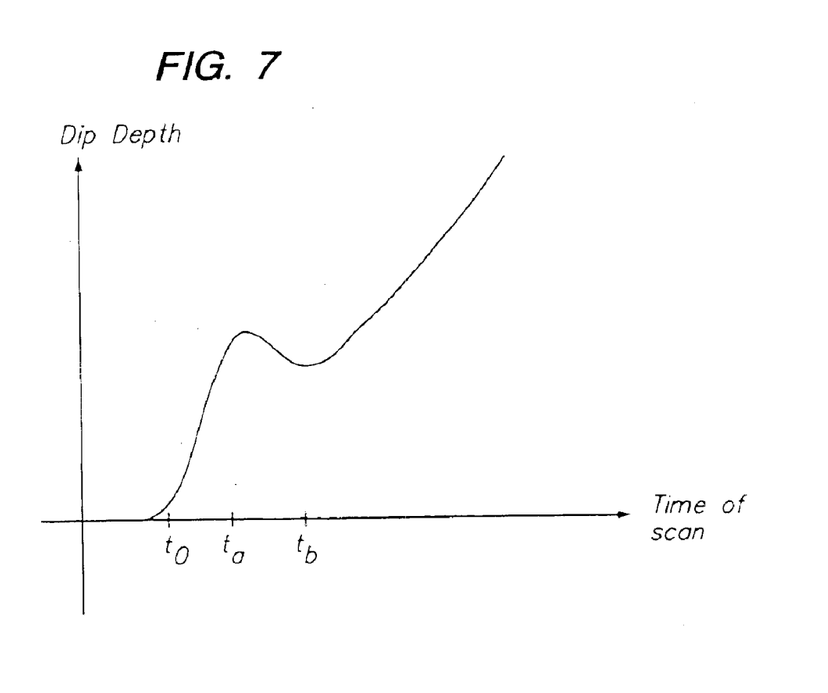
FIG. 7 is a graph of the maximum dip depth as a function of scan time for the acoustic wave forms of FIG. 6.

FIG. 7 is a graph of the maximum dip depth as a function of scan time over the same reaction time window of FIG. 6. Again, although the dip depth function shown in FIG. 7, in actuality, is discrete as represented by three points at the respective scan times of $t_0$, $t_a=t_0+\Delta t$ and $t_b=t_0+2\Delta t$, for illustrative purposes, the dip depth function is shown as being continuous. As can be clearly seen by the graph, dip depth is no longer a monotonic function of time. Moreover, this non-monotonic behavior is manifested within the reaction time window—and hence within the instantaneousness interval of human perception. Consequently, the controller 110 can make suitable adjustments to its reference signal, within the instantaneousness window, to remove the effects of this invalid touch. Thus, the user does not perceive any effect from the water, and may use the touchscreen 105 as if the water contamination had never happened.

Figure 8:
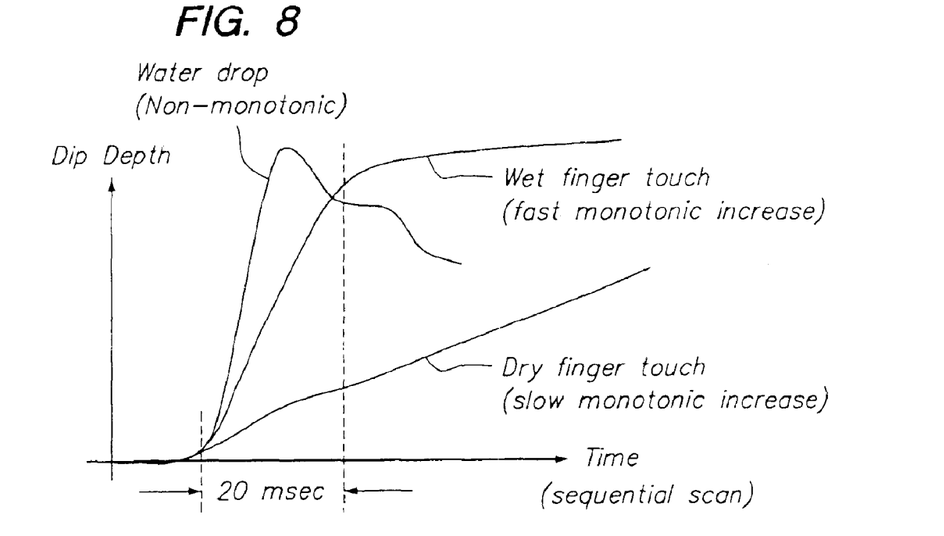
FIG. 8 is a graph of dip depth as a function of time, generated by the system of FIG. 2, comparing the behaviors of a dry finger touch, a wet finger touch, and a water drop.

FIG. 8 graphically compares dip depth functions for a dry finger touch, a wet finger touch, and a water drop landing on the surface 122. On the one hand, both the dry and wet finger touches exhibit monotonic behavior, with the dry finger touch producing a relatively slow monotonic increase in dip depth, and the wet finger touch producing a relatively fast monotonic increase in dip depth. Thus, even a wet finger touch exhibits monotonic behavior. On the other hand, the water drop exhibits non-monotonic behavior. It is this non-monotonicity that distinguishes an invalid touch from a valid touch.

Figure 9:
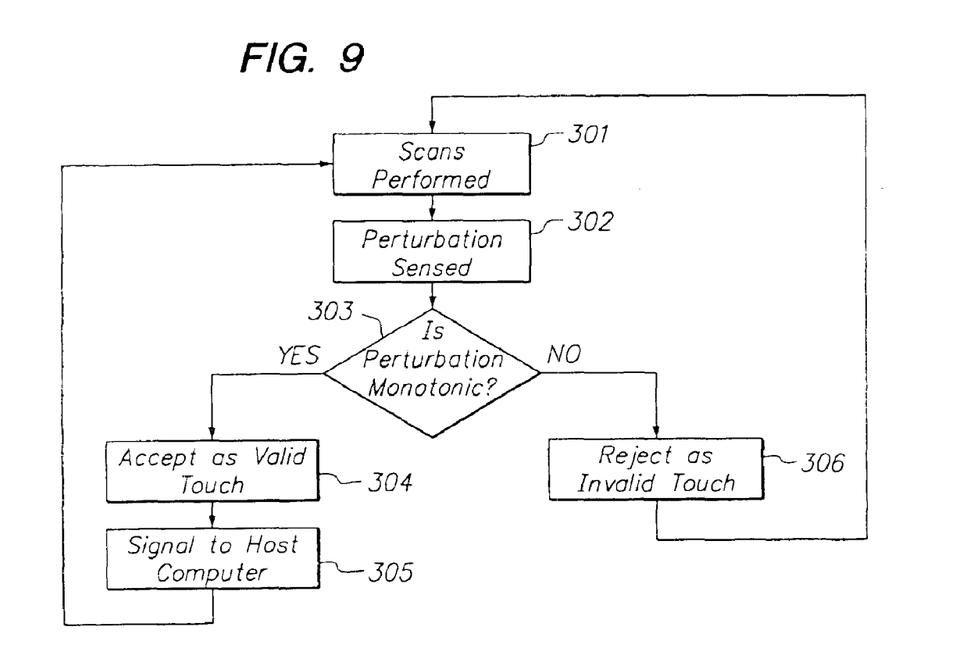
FIG. 9 is a flow chart that outlines the overall methodology used by the system of FIG. 2 to determine whether a touch is valid.

FIG. 9 is a flow diagram that illustrates the overall manner in which the system 100 distinguishes valid touches from contaminants. The process will be described for determining a single coordinate (for example, along the X-axis) but it should be understood that the other coordinate (i.e., along the Y-axis) can be determined in the same manner. First, acoustic energy (in the form of a plurality of acoustic scans) is received from the substrate surface 122 (e.g., in the X-direction) (step 301). The acoustic energy (i.e., the acoustic scan) is then examined for a perturbation that may be caused by an environmental event, such as a touch or a contaminant (step 302). Next, the growth of the perturbation (if it exists) is analyzed over a given period of time for its monotonicity (step 303). If the perturbation growth is monotonic, the environmental event is identified as a valid touch (step 304), in which case the touch location is sent from the controller 110 to the host computer (step 305). If the perturbation growth is non-monotonic, the environmental event is identified as a contaminant (step 306), in which case the touch location is not sent from the controller 110 to the host computer. After the environmental event has been identified as either a valid touch (step 304) or a contaminant (step 306), the process returns to step 301.

The process illustrated in FIG. 9 may be applied to either the X signal, or the Y signal, or preferably both. The algorithm designer may choose to reject water drops based on non-monotonic behavior in either signal, or alternatively may choose to require non-monotonic behavior on both signals. Particularly when combined with other water rejection-algorithms of the prior art, algorithms with more complex decision making trees are contemplated. In any case, use of non-monotonic behavior as a signature of contamination leads to improved algorithms.

Having generally described the preferred method of distinguishing valid touches from contaminants, the method will now be described in further detail in the context of a plurality of acoustic scans. The way in which the controller 10 corrects for contamination can best be understood by once again comparing valid and invalid touches. Suppose a valid touch has been made and the controller 10 has received the signal it will use to determine the horizontal coordinate of the touch (vertical component calculations are, of course, entirely analogous, as described above). The controller 10 subtracts the received signal from a stored signal—a signal received k scans prior to the presently received signal, where k=1, 2, 3, . . . is a suitably chosen integer, the choice of which is left to the predilection of the system designer. Symbolically this operation can be represented as: $X_d=X_i-X_{i-k}$, where $X_i$ is the most recently scanned value, $X_{i-k}$ is the value k scans prior to the present signal, and $X_d$ is the kth differential signal. The subtractions yield the negative dip that is characteristic of the touch. Since dip depth for a valid touch is a monotonically increasing function, the result of the subtractions at each scan within the reaction time window will reflect the relation: dip depth>stored dip depth. Faced with this monotonic data, the controller 10 will accept the touch as valid.

Suppose now, that water contamination has landed on the surface 122 and the controller 110 has received the horizontal signal (once again, vertical component calculations are entirely analogous). Since the dip depth function of the water exhibits non-monotonic behavior, some of the differences will not reflect the relation: dip depth>stored dip depth. As soon as the controller 110 determines that this relation is violated, it will reject the touch as invalid.

Figure 10:
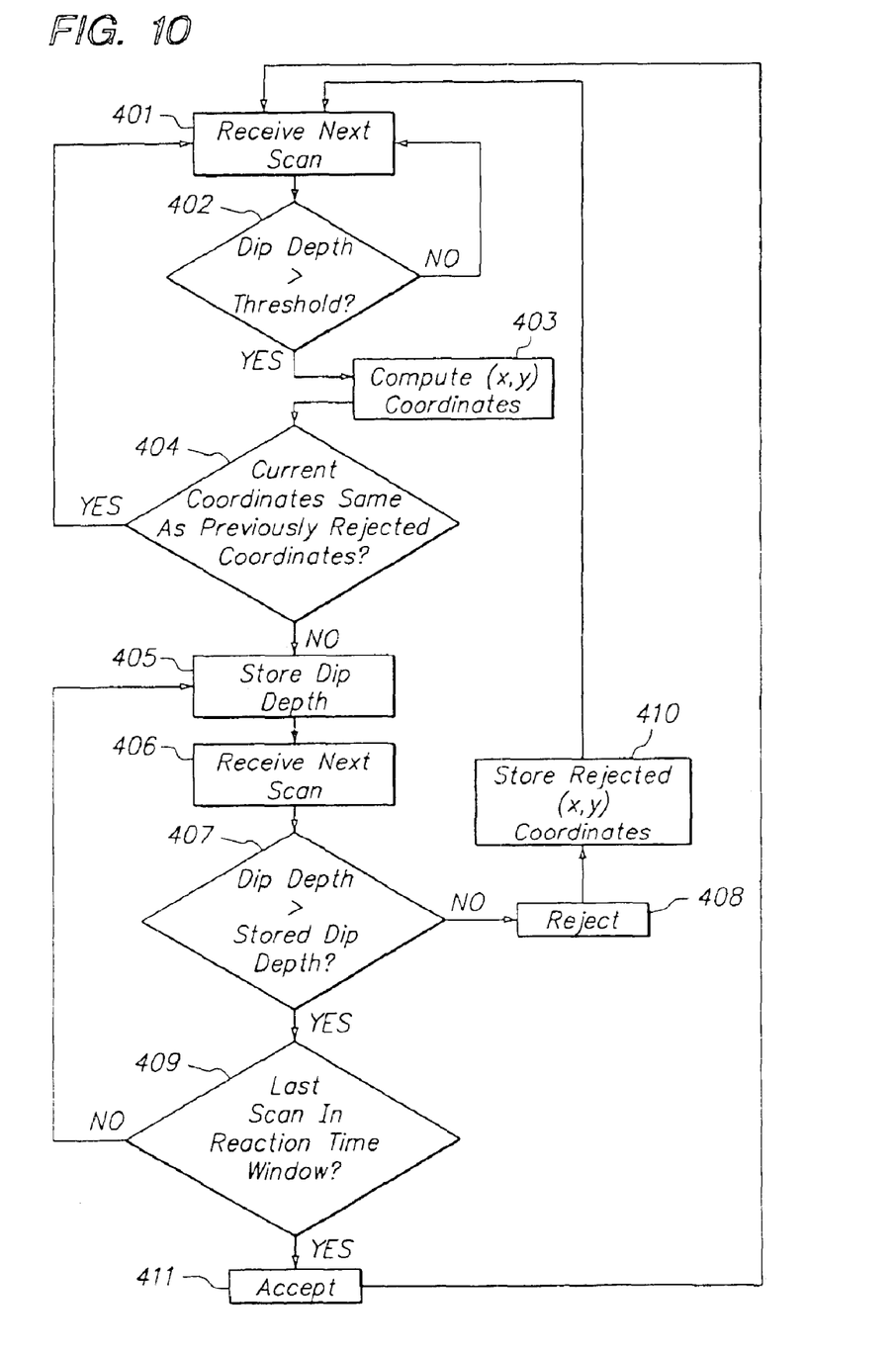
FIG. 10 is a flow chart of a methodology used by the system of FIG. 2 for determining whether a touch is valid based on differences between maximum dip depth values.

FIG. 10 is a flow chart illustrating the manner in which this process is implemented. First, an acoustic wave is sent across the substrate surface 122 (step 401). If the controller 110 detects some perturbation of the signal, the controller 110 compares the perturbation with a threshold value (step 402). If the dip depth of the perturbation is less than the threshold value, the controller 110 treats the signal as if no environmental event occurred, and thus returns to step 401 where another scan is monitored. Otherwise, the controller 110 computes the X and Y coordinates associated with the signal (step 403) and compares the result to any stored previously rejected coordinates, i.e., coordinates previously determined to be associated with contamination (step 404). If the coordinates are the same as those of a previously rejected contamination, the controller 110 rejects the signal and returns to step 401. As will be appreciated in view of the following discussion, this coordinate comparison step is performed, so that previous contamination induced perturbations, which may only exhibit a non-monotonic growth for a short period of time (see FIG. 7), are not subsequently identified as valid touches when they begin exhibiting a monotonic growth. If the coordinates associated with the current signal are different than previously rejected coordinates at step 404, the controller 110 stores the dip depth (step 405) and then monitors the next scan (step 406). Next, the dip depth of the next scan is compared with the dip depth of the previous or stored scan (step 407). If the later dip depth is less than the earlier scan's dip depth, the dip depth function (i.e., the perturbation growth) is considered to be non-monotonically increasing, and thus, the event is treated as an invalid touch (step 408), in which case, the signal is rejected as invalid, its coordinates are computed, and are stored (step 410). The process then returns to the beginning at step 401. If the later dip depth is greater than the earlier scan's dip depth, it is determined whether the previous scan was the last scan in the reaction time window (step 409). If it is not, the latest dip depth is stored (step 405) and another acoustic scan is monitored and subsequently compared with the previous scan (steps 406 and 407). If so, the dip depth function (i.e., the perturbation growth) is considered to be monotonically increasing, and thus, the event is treated as a valid touch (step 411), in which case, the signal is treated as valid. The process then returns to the beginning at step 401.

As briefly discussed above, steps 403, 404, and 410 are included to prevent a previously rejected contamination from later being accepted. Suppose, for example, that a water drop lands on the substrate surface 122 and is rejected due to its non-monotonic behavior, but its coordinates are not computed and stored. Eventually the water drop will stabilize (assuming it does not move along the substrate surface 122) and the original non-monotonic behavior will cease even though the water still remains on the substrate surface 122. Once that happens, then when the next scan is monitored in step 401, there will be a large false touch dip due to the remaining water drop. The dip depth of the water will therefore pass the "Dip Depth>Threshold?" condition of step 402. However, since the previous non-monotonic behavior was not stored in the form of the rejected coordinates of the spurious touch, and since the later behavior is monotonic in character, the water drop will be incorrectly accepted as a valid touch. If instead the coordinates of the spurious touch are stored in step 410, then when the water drop is identified as an environmental event in step 402, its coordinates are computed in step 403, and compared in step 404 to the stored coordinates of the spurious touch, it will again be rejected as being the same water drop, since its coordinates agree with those of the previously rejected spurious touch, even though it might not be exhibiting non-monotonic behavior any more.

It should be noted that the system does not have to restrict itself to comparing dip depths of successive scans. Instead it can compare dip depths of scans that are k scans apart, where k is a positive integer. k can be advantageously chosen to be larger than one when the number of scans per reaction time window is very large—a setting where the system may be susceptible to over-sensitivity. A larger k reduces the likelihood of false positives, while still allowing for the increased sensitivity afforded by many scans per reaction time window. Thus, when the number of scans per reaction time window is large, instead of taking successive scan dip depth differences, where those differences could be extremely small due to the small time intervals, the system will take dip depth differences of scans that are k scans apart. However, even though differences are computed k scans apart, each scan is still represented in the data since each scan's dip depth is subtracted from the dip depth of the scan k steps ahead of it, and has the dip depth of the scan k steps prior to it subtracted from it. Thus, the increased number of scans provides an increase in available data, but the k step jump at each operation provides a check against over-sensitivity.

Figure 11:
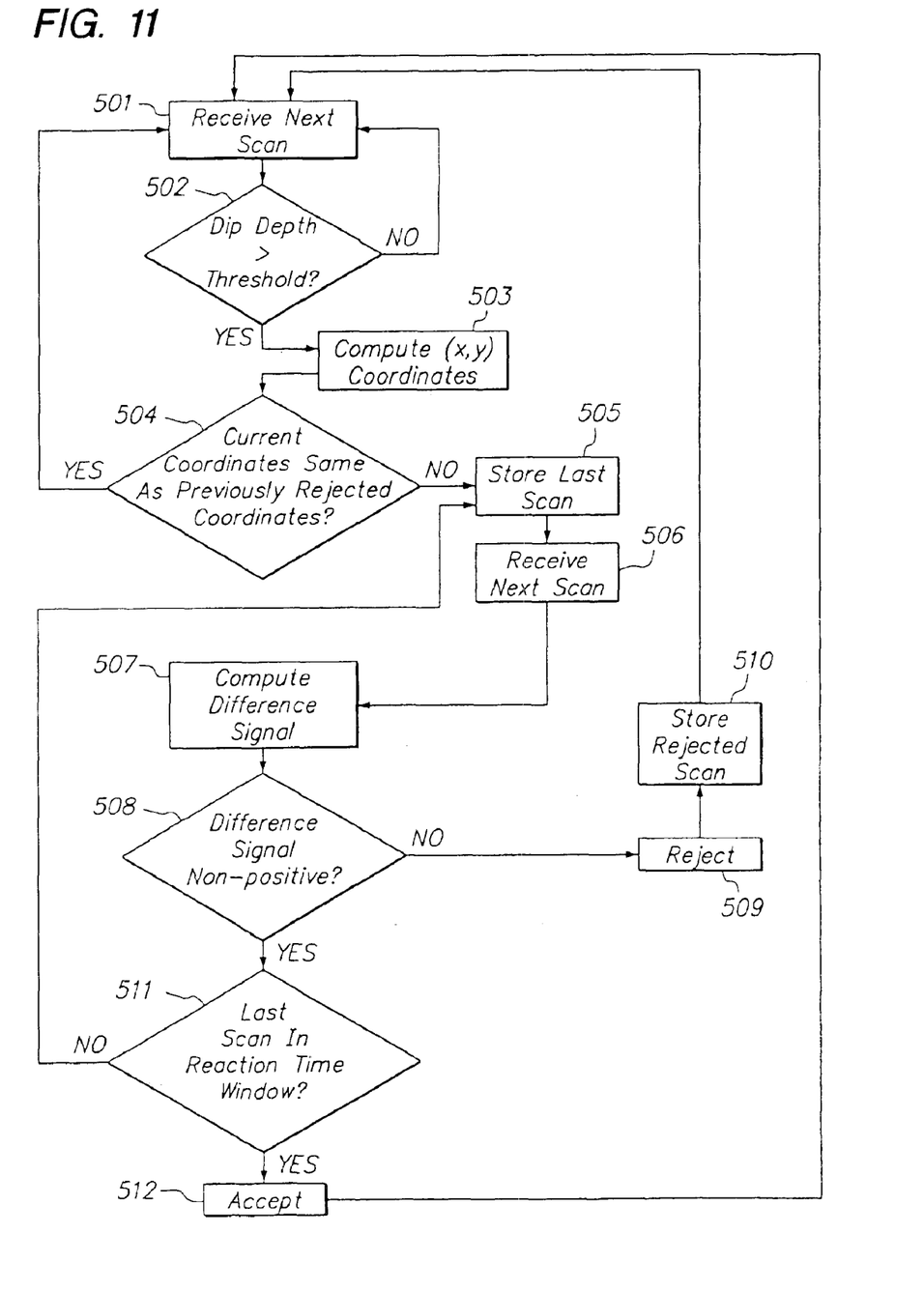
FIG. 11 is a flow chart of a methodology used by the system of FIG. 2 for determining whether a touch is valid based on differences between acoustic wave forms.

It is significant that the procedure illustrated in FIG. 10 uses only dip depths, so that the memory requirement is thus not very great: the system only needs to store one number—the dip depth—per scan. FIG. 11 illustrates an alternative embodiment that uses a different approach. Instead of storing only one number per scan, this alternate embodiment stores many values per scan. In essence, it samples the entire amplitude curve and stores enough values to provide an approximation to the entire curve. In particular, it will store at least two values per scan. FIG. 11 is thus a flow chart illustrating the manner in which this process is implemented. First, an acoustic wave is sent across the substrate surface 122 (step 501). If the system detects some perturbation of the signal, it compares it with a threshold value (step 502). If the dip depth of the perturbation is less than the threshold value, the system treats the signal as if no environmental event occurred, and thus returns to step 501 where the next scan is monitored. Otherwise, the controller 110 computes the X and Y coordinates associated with the signal (step 503) and compares the result to any stored previously rejected coordinates, i.e., coordinates previously determined to be associated with contamination (step 504). If the coordinates are the same as those of a previously rejected contamination, the controller 110 rejects the signal and returns to step 501. This comparison step is performed for the same reasons described above with respect to FIG. 10. If the coordinates associated with the current signal are different than previously rejected coordinates at step 504, the controller 110 stores the scan information (step 505) and then monitors the next scan (step 506). Next, the differences between the two scans are computed (step 507)—i.e., the earlier scan is subtracted from the later scan on a point by corresponding point basis, where a point in the later scan corresponds to a point in the earlier scan if they occurred at the same time in their respective scans. If the later scan is less than the earlier scan—i.e., at least one of the differences is negative—the perturbation growth is considered to be non-monotonically increasing, and thus, the event is treated as an invalid touch (step 508), in which case, the signal is rejected (step 509) as invalid and the invalid scan is stored (step 510). The process then returns to the beginning at step 501. If the later scan is greater than the earlier scan—i.e., the differences are all positive—it is determined whether the last scan is the last scan in the reaction time window (step 511). If it is not, the latest scan is stored (step 505) and another acoustic scan is performed and subsequently compared with the previous scan (steps 506 and 507). If so, the perturbation growth is considered to be monotonically increasing, and thus, the event is treated as a valid touch (step 512), in which case, the signal is treated as valid. The process then returns to the beginning at step 501.

Since the embodiment illustrated in FIG. 11 (the "full scan" embodiment) stores multiple values per scan, whereas the embodiment illustrated in FIG. 10 (the "dip depth" embodiment) only stores one value per scan, the full scan embodiment requires greater memory capacity than the dip depth embodiment. Therefore, the designer who faces memory constraints may choose to implement the dip depth embodiment rather than the full scan embodiment. However, if memory is not a limiting consideration, the full scan embodiment provides a significant benefit in that it can pick up minor non-monotonic behavior that may not be apparent in the dip depth embodiment. This benefit is illustrated in FIGS. 12 and 13.

Figure 12:
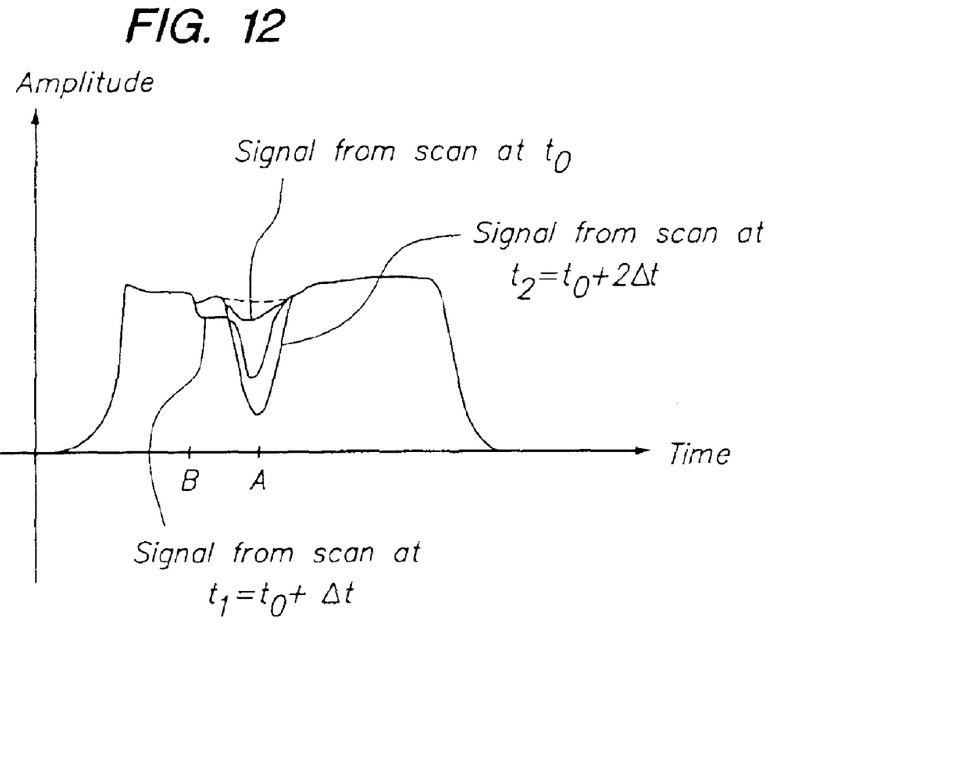
FIG. 12 is a series of graphs of three acoustic wave forms, generated by the system of FIG. 2, superimposed on each other, showing the pseudo non-monotonic dip depth behavior of an invalid touch.

FIG. 12 shows the result of three scans, and illustrates a subtlety that is not apparent using the dip depth embodiment, but is apparent using the full scan embodiment. The behavior of the dip depth function at a delay time A (the time during each scan where the dip depth function displays it greatest amount of activity) is monotonic—the depth at scan time $t=t_0+\Delta t$ (where $t_0$ is the start time of the first scan and $\Delta t$ is the time between scans) is less than the dip depth at scan time $t=t_0+2\Delta t$. Again, although the dip depth function in FIG. 7 is shown as being continuous for illustrative purposes, the dip depth function in actuality is discrete, represented by three points at the respective scan times of $t_0$, $t_a=t_0+\Delta t$ and $t_b=t_0+2\Delta t$.

Figure 13:
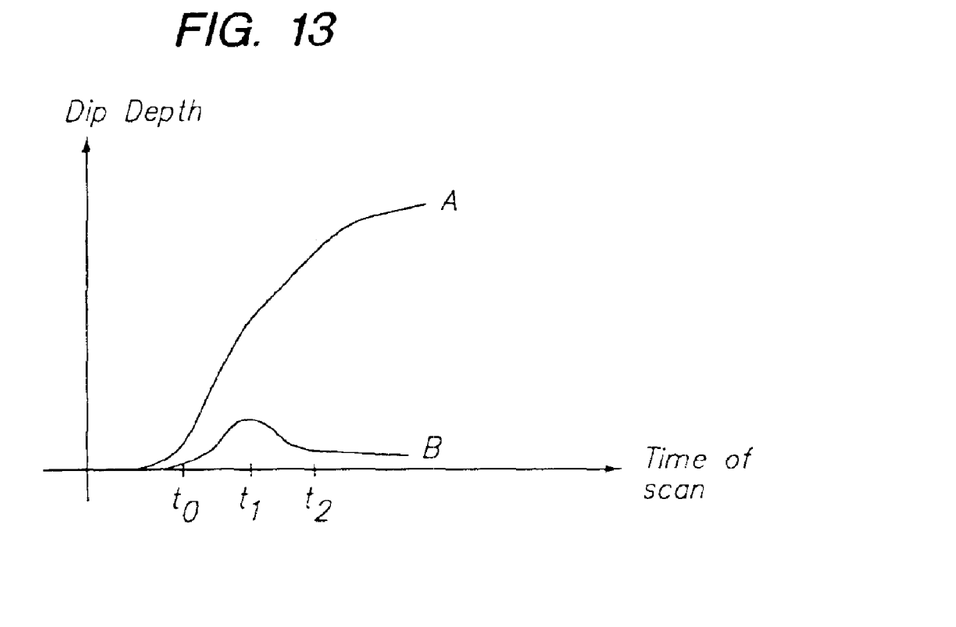
FIG. 13 is a graph of dip depths at two delay times for the acoustic wave forms of FIG. 12.

FIG. 13 is a graph of the dip depths at times A and B as a function of scan time over the same reaction time window of FIG. 12. Again, although the dip depth functions shown in FIG. 13, in actuality, are discrete as represented by three points at the respective scan times of $t_0$, $t_a=t_0+\Delta t$ and $t_b=t_0+2\Delta t$, for illustrative purposes, the dip depth functions are shown as being continuous. FIG. 13 clearly shows that the dip depth behavior at time A is monotonic. Thus, if the dip depth embodiment measured the dip depth behavior at A, which it would since that is the time where the greatest dip depth activity is occurring, it would lead to an acceptance of the touch as valid. However, since the full scan embodiment samples the entire scan, it can also compare the two scans at B—a time where some dip depth variation is occurring, but not in as pronounced a fashion as at A. The behavior at B is non-monotonic since the depth there at scan time $t=t_0+\Delta t$ is greater than the dip depth there at scan time $t=t_0+2\Delta t$. FIG. 13 clearly shows that the dip depth behavior at time A is monotonic. Therefore, the full scan embodiment will reject the signal based on its more complete picture of scan behavior. Thus, the full scan embodiment may provide a more complete and accurate analysis of a given environmental event, but as previously noted, it requires more memory—especially if the number of points sampled per scan is large. Therefore, an important factor that must be considered in choosing between the two embodiments is the degree of memory availability of the system.

It should be noted that combinations and hybrids of these various ways of computing dip depth differences in the dip depth embodiment and scan differences in the full scan embodiment can be used. For example, the system 100 can use multiple values of k simultaneously within a given reaction time window.

Optionally, in the dip depth embodiment, a reference dip depth can be used instead of successive dip depths. Thus, dip depths can have a reference value subtracted from them. Symbolically this can be represented as $X_n=X_i-X_r$, where the $X_r$ is the reference signal, $X_i$ is the most recently scanned value, and $X_n$ is the resultant processed signal. These differences can then be graphed. If the graph of these differences is increasing over the reaction time window, then dip depth is monotonic and the signal is valid. Otherwise it is rejected. Similarly, in the full scan embodiment scans can have a "normal" scan subtracted from them and the results can be graphed. If the result is increasing throughout the scans then the environmental event is monotonic and the signal is accepted. Otherwise it is rejected. In either case, if the touch lasts longer than some threshold time, such as, for example, 30 seconds, the controller 110 can replace the reference signal with the most recent signal, and memorize out the ongoing touch. In effect, this resets the reference value to the value associated with the protracted touch. Thus, this embodiment of the system 100 is dynamic in nature.

In addition, the system 100 can allow the designer to determine how "non-monotonic" the perturbation must before associating it with a valid finger touch or a contaminant, thereby minimizing the rate of false positives (water drops interpreted as finger touches) or alternatively minimizing the rate of false negatives (finger touches falsely rejected). On the one hand, for example, before rejecting a touch candidate, the signal behavior can be required to be "significantly non-monotonic" rather than simply "non-monotonic." In such a case, the calculated differences can be compared to some nonzero value rather than zero, so that rejection would occur only if the relation: dip depth<stored dip depth+C were satisfied, for some positive C. On the other hand, before accepting a touch candidate as a valid touch, the system may require that the signal behavior be "convincingly monotonic" rather than simply monotonic. This could be implemented by requiring that dip depth>stored dip depth+C, for some positive C. If a threshold level is used to quantify "significantly non-monotonic" or "convincingly monotonic" signal behavior, the threshold, C, can take a variety of forms. It may be a fixed constant in units of analog-to-digital-converter counts, or it may be a percentage of the touch dip depth. Other options such as positive valued functions are, of course, possible. Similarly, a threshold function can be applied to the full scan embodiment—i.e., throughout each scan rather than just at one time point.

Another option is to include some sort of hydrophobic or water repellant coating on the surface 122. Such a coating could provide some improvement in water immunity, and when combined with the above described way of addressing water generated false readings could increase the efficiency of the system. Indeed, it has been experimentally determined that such hydrophobic coatings significantly enhance the non-monotonic signal behavior of water contamination.

Although the above discussion has been set forth in the context of an acoustic touchscreen system 100, it applies to the more general setting of a touch-sensitive system. This includes other types of touch sensors (e.g., opaque touch pads or touch sensitive robot shells). A variety of sensors with sensitive surfaces can be imagined. Indeed, the acoustic touchscreen system 100 is really just a specific type of a touch sensitive system, where the acoustic substrate 120 is specifically designed to operate in the touchscreen 105. Thus, the present discussion, in its broadest aspects, should be thought of as applying in that more general setting.

Although particular embodiments of the present invention have been shown and described, it should be understood that the above discussion is not intended to limit the present invention to these embodiments. Those of ordinary skill in the art will appreciate that various changes and modifications may be made without departing from the spirit and scope of the present invention. Thus, the present invention is intended to cover alternatives, modifications, and equivalents that may fall within the spirit and scope of the present invention as defined by the claims.

What is claimed is:

1. A method of reducing the effects of contaminants on a touch sensor substrate, comprising:

receiving acoustic energy transmitted across the substrate;

determining the presence of a perturbation within the acoustic energy induced by an environmental event;

analyzing a growth of the perturbation over a time period; and identifying the environmental event as a contaminant if the pertubation exhibits non-monotonic growth, and identifying the environmental event as a touch if the perturbation exhibits monotonic growth.

2. The method of claim 1, wherein the acoustic energy is generated from a Rayleigh wave.

3. The method of claim 1, wherein the acoustic energy comprises a plurality of parallel wave components transmitted across the substrate, at least one of which exhibits the perturbation, the method further comprising identifying a coordinate of the location of the perturbation on the substrate based on the at least one parallel wave component.

4. The method of claim 1, wherein the time period is predetermined.

5. The method of claim 1, wherein the time period is below the level of human perception.

6. The method of claim 1, wherein the time period is equal to or less than 30 milliseconds.

7. The method of claim 1, wherein the perturbation growth is only analyzed if the perturbation is above a threshold level.

8. The method of claim 1, wherein the contaminant is liquid.

9. The method of claim 1, wherein the perturbation comprises an attenuation in the acoustic energy.

10. The method of claim 1, wherein the environmental event is identified as a contaminant if the perturbation exhibits significant non-monotonic growth.

11. The method of claim 1, wherein the environmental event is identified as a touch if the perturbation exhibits convincingly monotonic growth.

12. The method of claim 1, wherein the environmental event is identified as a contaminant if the perturbation exhibits simple non-monotonic growth, and is identified as a touch if the perturbation exhibits simple monotonic growth.

13. The method of claim 1, wherein receipt of the acoustic energy comprises monitoring a plurality of acoustic scans across the substrate during the time period, the analysis of the perturbation growth comprises comparing the perturbations during the plurality of acoustic scans.

14. The method of claim 13, wherein the analysis of the perturbation growth further comprises:

identifying the perturbation growth as non-monotonic if any perturbation during an $(i+k)^{th}$ acoustic scan is less than a perturbation during an $i^{th}$ acoustic scan, where i is the current acoustic scan and k is a positive integer; and identifying the perturbation growth as monotonic otherwise.

15. The method of claim 14, wherein the perturbation comparison comprises calculating the differences between the maxima of the absolute values of the perturbations.

16. The method of claim 14, wherein the perturbation comparison comprises calculating the differences between waveforms of the perturbations.

17. The method of claim 1, wherein the substrate is transparent.

18. The method of claim 1, wherein the substrate is opaque.

19. A computer readable medium for reducing the effects of contaminants on a touch sensor substrate, the computer readable medium storing instructions, which when executed, comprise:

analyzing a growth of a perturbation within a signal over a time period, the perturbation being induced by an environmental event associated with the substrate; and identifying the environmental event as either a contaminant if the perturbation exhibits non-monotonic growth, and identifying the environmental event as a touch if the pertubation exhibits monotonic growth.

20. The computer readable medium of claim 19, wherein the instructions, when executed, further comprise identifying one or more coordinates of the location of the perturbation on the substrate.

21. The computer readable medium of claim 19, wherein the time period is predetermined.

22. The computer readable medium of claim 19, wherein the time period is below the level of human perception.

23. The computer readable medium of claim 19, wherein the time period is equal to or less than 30 milliseconds.

24. The computer readable medium of claim 19, wherein the perturbation growth is only analyzed if the perturbation is above a threshold level.

25. The computer readable medium of claim 19, wherein the contaminant is liquid.

26. The computer readable medium of claim 19, wherein the perturbation comprises an attenuation in the signal.

27. The computer readable medium of claim 19, wherein the environmental event is identified as a contaminant if the perturbation exhibits significant non-monotonic growth.

28. The computer readable medium of claim 19, wherein the environmental event is identified as a touch if the perturbation exhibits convincingly monotonic growth.

29. The computer readable medium of claim 19, wherein the environmental event is identified as a contaminant if the perturbation exhibits simple non-monotonic growth, and is identified as a touch if the perturbation exhibits simple monotonic growth.

30. The computer readable medium of claim 19, wherein the instructions, when executed, further comprises initiating a plurality of acoustic scans across the substrate during the time period, the analysis of the perturbation growth comprises comparing the perturbations during the plurality of acoustic scans.

31. The computer readable medium of claim 30, wherein the analysis of the perturbation growth further comprises:

identifying the perturbation growth as non-monotonic if any perturbation during an $(i+k)^{th}$ acoustic scan is less than a perturbation during an $i^{th}$ acoustic scan, where i is the current acoustic scan and k is a positive integer; and identifying the perturbation growth as monotonic otherwise.

32. The computer readable medium of claim 31, wherein the perturbation comparison comprises calculating the differences between the maxima of the absolute values of the perturbations.

33. The computer readable medium of claim 31, wherein the perturbation comparison comprises calculating the differences between waveforms of the perturbations.

* * * * *